April 16, 1929.　　　P. F. GAUCHOT　　　1,709,784
PIVOTING HEAD LAMP FOR VEHICLES
Filed June 9, 1927　　　3 Sheets-Sheet 3

Patented Apr. 16, 1929.

1,709,784

UNITED STATES PATENT OFFICE.

PROSPER FÉLIX GAUCHOT, OF PARIS, FRANCE.

PIVOTING HEAD LAMP FOR VEHICLES.

Application filed June 9, 1927, Serial No. 197,748, and in France March 30, 1927.

The present invention relates to head lamps for motor or other vehicles and the object of the invention is to prevent dazzle effect by the beam of light when passing pedestrians, other vehicles and all other users of the road in general.

The invention permits this result to be obtained while preserving sufficient illumination to permit the driver of the vehicle to steer with perfect assurance, without reducing the power of the lamps and, in particular, with a normal illumination on the lower right hand side of the road (French rule of the road) especially at turnings.

The invention consists essentially in giving the head lamps a certain freedom of pivotal movement around a vertical axis by mounting them upon balls or other bearings and in controlling their angular movement, the amplitude of which is moreover, very small, by means of a single or double Bowden type cable actuated by the driver.

Opposing devices such as springs constantly hold or return the lamps into the position which corresponds to the normal direction of the beam of light along the axis of the road.

It will be understood that the invention also relates to the complete construction of pivoting head lamps and the transforming of existing head lamps into pivoting head lamps.

The invention will be clearly understood from the following description of the embodiment of the invention shown in the accompanying drawing, in which.

Figure 1:
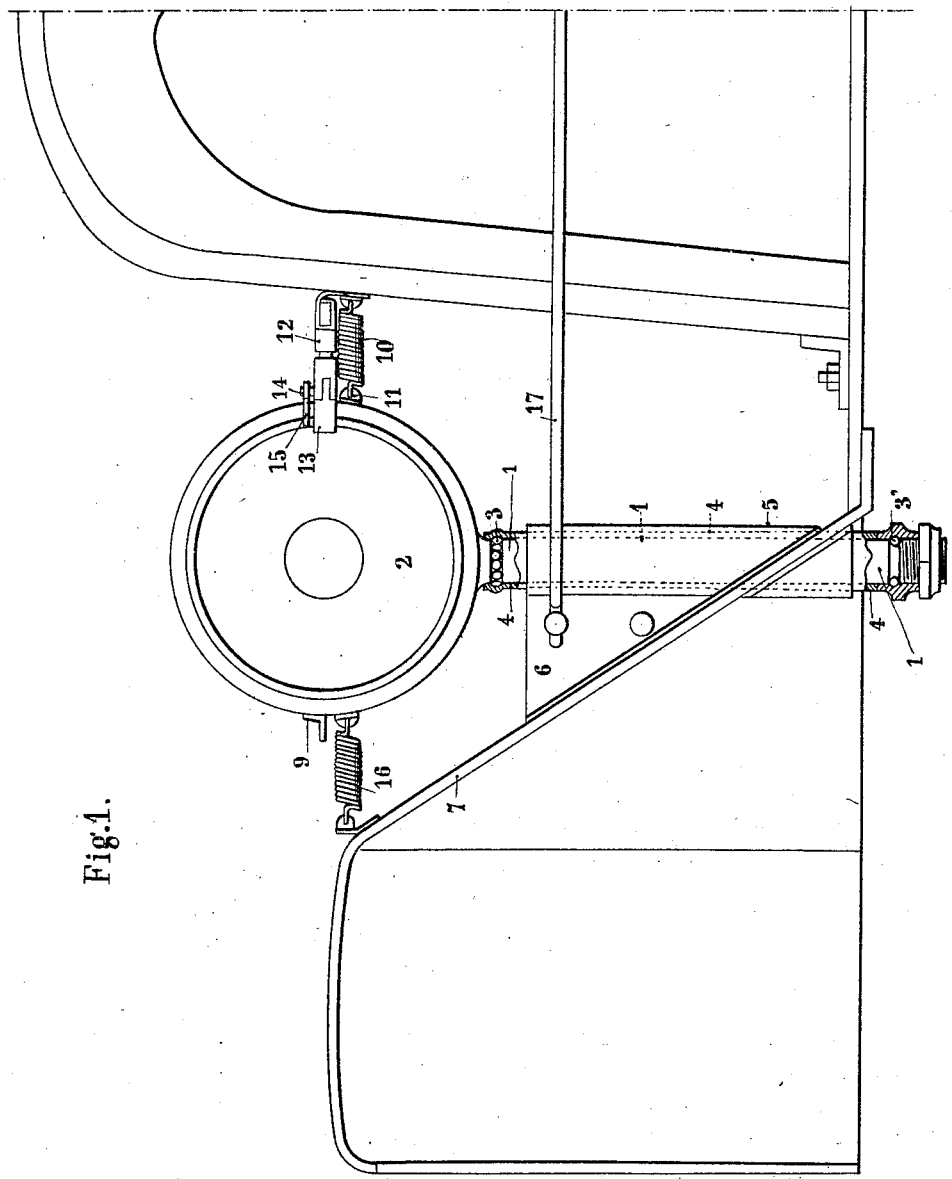
Fig. 1 shows a front view of the mounting of one of the head lamps (the right hand lamp).
Figure 2:
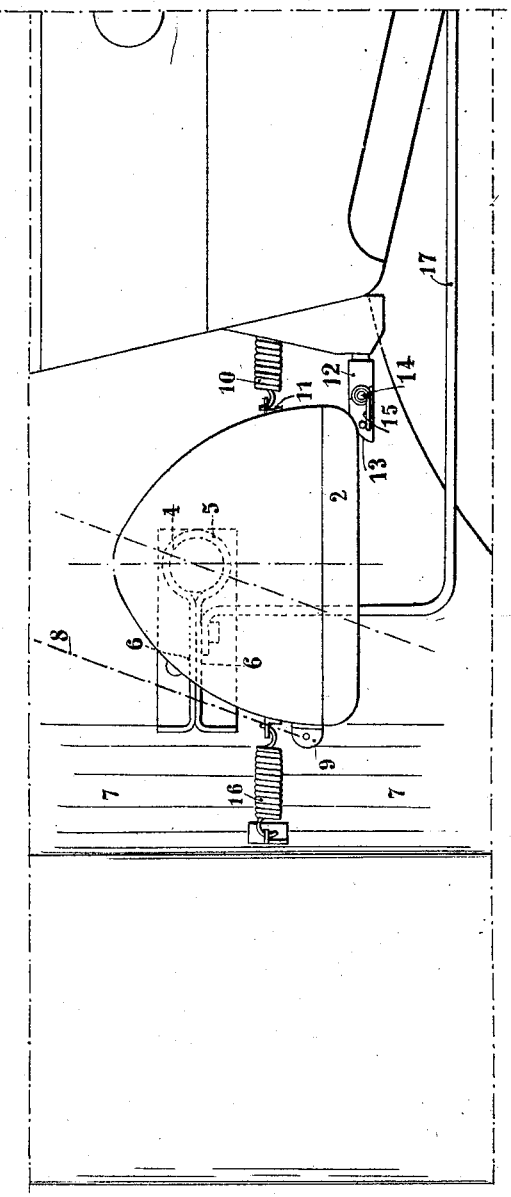
Fig. 2 is a plan view of Fig. 1.
Figure 3:
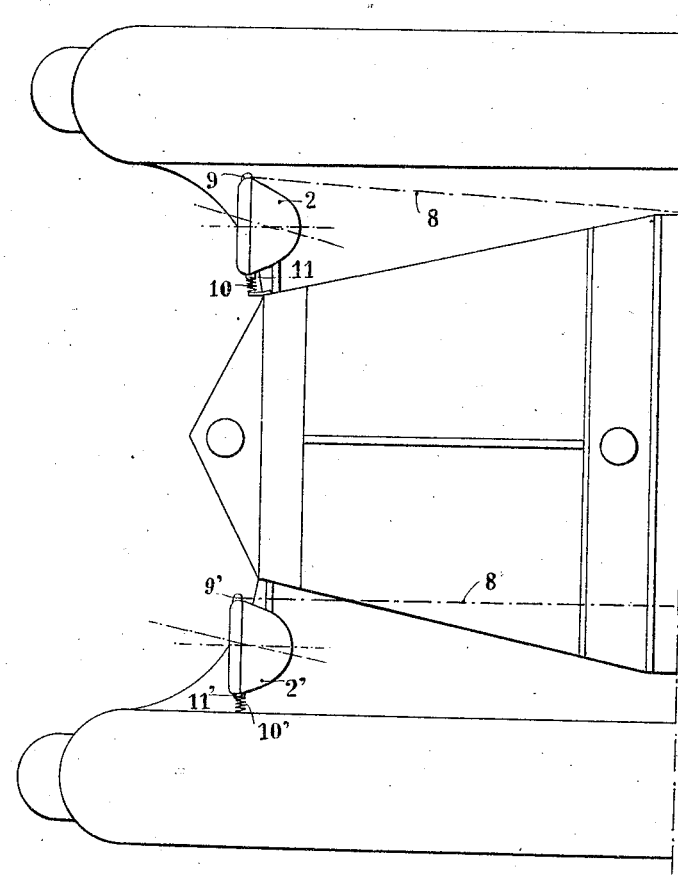
Fig. 3 is a diagrammatic plan view showing the front part of a motor vehicle fitted with head lamps according to the invention.

In the example shown in Fig. 1, the tube 1 carrying the head lamp 2, is mounted upon two ball bearings 3, 3' an upper and a lower one, which turn in an outer sleeve 4 which completely encloses the lamp carrying the tube 1.

The manner of mounting the sleeve 4 upon the chassis will obviously vary in each particular case. In the example shown this mounting is effected by means of a second sleeve 5 made of sheet metal suitably bent so as to form two triangular wings 6 joined together and riveted upon the wing 7 of the vehicle. A cross bar 17 connects together the sleeves 5 supporting each of the head lamps with a view to making the arrangement more rigid.

The head lamps are each controlled by a tension cable, 8 and 8' respectively, of the Bowden type of transmission, for example; the cable of each lamp is attached to a ring 9, or 9', mounted upon the right hand side of the head lamp. It is connected at its other end to a pull member provided with a stop, which member is straight or lever mounted and is arranged handy to the driver, upon the dash-board of the vehicle. This pull member is temporarily immobilized when the vehicle is passing a pedestrian or oncoming vehicle by means of a locking device of any type.

It is necessary for the head lamps to be turned into their normal position only after the vehicle has passed a pedestrian or a vehicle travelling in the opposite direction. For this purpose a return spring 10 is provided upon the left hand side of each lamp and is attached at one end to a ring 11, or 11', on the lamp, and at the other end either to the upright of the radiator or to the left hand wing of the vehicle, according whether it is the left hand head lamp or the right hand head lamp.

In order to ensure that the head lamps will be held in a stationary position notwithstanding any unevenness of the road surface, each lamp is provided with a stop device formed by a Ruce joint stop 12 the beak 13 of which engages upon the inner part of the edge of the lamp mounting. This Ruce joint stop opens slightly by turning about its pivot 14 and compressing its spring 15 when the lamp is made to pivot by the actuation of its control. When the control rod is released after passing the pedestrian or oncoming vehicle the lamp is returned by its side spring and the beak 13 again holds the lamp stationary in its normal position.

In certain cases a second spring 16 may be provided upon each lamp for assisting in holding the lamp in its correct normal position.

It is to be clearly understood that all these details given of the mounting do not limit the invention in any way and that they may comprise various modifications according to circumstances of the cases. In particular one of the controls 8 or 8' may be dispensed with and the two lamps coupled together by a cross rod. Similarly the arrangement does not necessarily require the provision of two ball bearings. It is adapted for use, with a single bearing, on head lamps mounted upon a rod threaded and screwed by nuts in the interior of the head lamp proper and thus permitting pivotal movement to take place. More generally the invention may easily be fitted upon all head lamps which claim to have a pivot mounting.

I claim:—

1. In a headlight for motor vehicles, a pair of lamps having their spindles mounted for rotary movement on opposite sides of the vehicle, spring members interposed between the corresponding sides of the lamps and adjacent portions of the vehicle for normally holding the lamps in proper position and for returning the lamps to such position, means connecting the opposite sides of the lamps and adapted to be manually operated to turn the lamps, and resilient stop devices mounted on the adjacent portions of the vehicle and normally arranged in yielding engagement with the adjacent front edges of the lamps for holding the lamps against accidental swinging movement and adapted to be moved inwardly upon the turning of the lamps, so that when the lamps are released they form yielding abutments for the lamps as the latter resume their normal positions.

2. A headlight for motor vehicles as claimed in claim 1, wherein the stop devices each consists of two sections pivotally and resiliently connected to each other, the outer section forming a beak and adapted for engagement with the adjacent edge of the lamp, substantially as and for the purposes set forth.

The foregoing specification of my "pivoting head lamps for vehicles" signed by me this 27th day of May, 1927.

PROSPER FÉLIX GAUCHOT.